United States Patent
Tanghe et al.

(10) Patent No.: US 11,171,559 B2
(45) Date of Patent: Nov. 9, 2021

(54) OVERCURRENT PROTECTION DETECTOR WITH DYNAMIC THRESHOLD FOR POWER CONVERSION SWITCH

(71) Applicant: Analog Devices International Unlimited Company, Limerick (IE)

(72) Inventors: Steven John Tanghe, Essex Junction, VT (US); Brian K. Jadus, Williston, VT (US)

(73) Assignee: Analog Devices International Unlimited Company, Limerick (IE)

( * ) Notice: Subject to any disclaimer, the term of this patent is extended or adjusted under 35 U.S.C. 154(b) by 42 days.

(21) Appl. No.: 16/715,815

(22) Filed: Dec. 16, 2019

(65) Prior Publication Data

US 2021/0184583 A1 Jun. 17, 2021

(51) Int. Cl.
*H02M 1/32* (2007.01)
*H02M 1/00* (2006.01)

(52) U.S. Cl.
CPC ............ *H02M 1/32* (2013.01); *H02M 1/0009* (2021.05); *H02M 1/0025* (2021.05)

(58) Field of Classification Search
CPC ........... H02M 1/32; H02M 2001/0009; H02M 2001/0025
See application file for complete search history.

(56) References Cited

U.S. PATENT DOCUMENTS

| | | | |
|---|---|---|---|
| 5,041,940 A | 8/1991 | Sullivan | |
| 6,347,028 B1 | 2/2002 | Hausman et al. | |
| 6,906,902 B2 | 6/2005 | Watanabe | |
| 7,568,117 B1 | 7/2009 | Fernald | |
| 8,018,745 B2 | 9/2011 | Fang et al. | |
| 8,102,679 B2 | 1/2012 | Gong et al. | |
| 9,214,934 B2 | 12/2015 | Cottell | |
| 9,553,501 B2 | 1/2017 | Yao et al. | |
| 9,627,879 B2 | 4/2017 | Zamprogno et al. | |
| 10,033,205 B2 | 7/2018 | Li | |
| 10,263,412 B2 | 4/2019 | Huber | |
| 10,298,223 B2 | 5/2019 | Hokazono et al. | |
| 2006/0007626 A1* | 1/2006 | Ohshima | H03K 17/0822 361/143 |
| 2018/0099574 A1* | 4/2018 | Zhou | H02M 7/537 |
| 2019/0123549 A1* | 4/2019 | Rodrigues | G06F 1/266 |

FOREIGN PATENT DOCUMENTS

| | | |
|---|---|---|
| CN | 100442620 C | 12/2008 |
| CN | 102214987 A | 10/2011 |
| CN | 102624237 B | 9/2015 |
| CN | 104009445 B | 6/2017 |

OTHER PUBLICATIONS

Luo, Junyang, et al., "Design of LIGBT Protection Circuit for Smart Power Integration", IEEE Transactions on Industrial Electronics, 47(4), (Aug. 2000), 744-750.

* cited by examiner

*Primary Examiner* — Jue Zhang
(74) *Attorney, Agent, or Firm* — Schwegman Lundberg & Woessner, P.A.

(57) ABSTRACT

An electronic circuit comprises a power switch and a fault detection circuit. The power switch circuit includes a power switch transistor. The fault detection circuit includes a comparator circuit configured to monitor a voltage across the power switch transistor and compare the voltage to a varying threshold voltage that decreases with time, and produce an indication of a circuit fault when the voltage of the power switch transistor is greater than the time varying threshold voltage.

20 Claims, 4 Drawing Sheets

OVERCURRENT PROTECTION DETECTOR WITH DYNAMIC THRESHOLD FOR POWER CONVERSION SWITCH

FIELD OF THE DISCLOSURE

This document relates to power conversion circuits and in particular to fault detection in power conversion circuits.

BACKGROUND

Electronic systems can include devices that require a regulated power source. Power conversion circuits can be used to provide a regulated voltage to a load. Some examples include DC-DC power converter circuits, power inverter circuits, and motor drivers. Power conversion circuits can include semiconductor switches to control delivery of energy to a circuit element such as an inductor, transformer, or motor. However, excessive power dissipation in the semiconductor switches can damage the switches. Fast detection of overcurrent conditions can avoid damaging the switch, but conventional approaches for detection can be too slow to prevent damage to the switches.

SUMMARY OF THE DISCLOSURE

This document relates generally to switching power converters and methods of their operation. In some aspects, an electronic circuit comprises a power switch and a fault detection circuit. The power switch circuit includes a transistor. The fault detection circuit includes a comparator circuit configured to monitor a voltage across the transistor and compare the voltage to a varying threshold voltage that decreases with time and produce an indication of a circuit fault when the voltage of the transistor is greater than the time varying threshold voltage.

In some aspects, a method of monitoring a power switch for a fault condition includes activating a transistor of the power switch, comparing a voltage across the transistor to a varying threshold voltage that decreases with time after the activating of the transistor, and indicating a circuit fault when the voltage of the transistor exceeds the varying threshold voltage.

In some aspects, a switching power converter circuit comprises a power switch circuit configured to provide energy to an energy storage circuit element of the switching power converter circuit, and a fault detection circuit. The power switch circuit includes a power transistor. The fault detection circuit includes a comparator circuit configured to monitor a voltage across the power transistor and compare the voltage to a varying threshold voltage that decreases with time and produce an indication of a circuit fault when the voltage across the power transistor is greater than the varying threshold voltage.

This section is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Power conversion circuits may be used to provide a regulated voltage output for an electronic system. Some power converter circuits are DC to DC switching power converter circuits that convert the input voltage to the regulated output voltage. The regulated voltage conversion can provide a regulated output voltage that is higher than the input voltage of the regulator, lower than the input voltage, or inverted from the input voltage. The regulation is typically achieved by recurrently charging an inductor from an energy source and then discharging the energy of the inductor to drive a load. Other power converter circuit can be DC to AC converter circuits such as inverters or motor drivers. The conversion circuits can include power switches that include transistors. The power switches can include power transistors that are rated for high current. However, excessive power dissipation in the power transistors can still damage the transistors leading to failure of the switching power converter circuit.

One approach to detect an excessive power condition of a power switch transistor is to monitor the voltage across the switch (e.g., the drain-to-source voltage (VDs) of a field effect transistor (FET) of the switch). The voltage across the power switch transistor is compared to a fault detection voltage threshold. When the voltage across the power switch transistor is greater than the fault detection threshold, a fault is declared.

A problem with this technique of fault detection is that when the power switch transistor is turned on, the voltage collapses from its OFF voltage (perhaps hundreds or thousands of volts) to the ON voltage (perhaps volts or less). The high voltages and fast transitions can cause a large amount of ringing on the drain voltage of the switching transistor due to parasitic inductance in the system. This ringing needs to settle out until it is below the fault detection threshold before performing the fault detection or else false faults will be triggered.

Adding a delay to the detection after turning on the switch to avoid circuit ringing can be used to address the problem but delaying the detection can mask situations that can damage the switching transistors. An improved approach is to use a fault detection threshold that varies with the turn ON of the switch.

Figure 1:
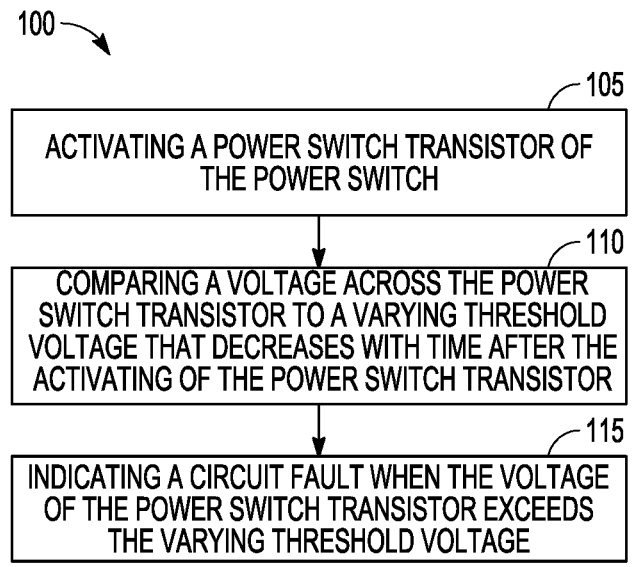
FIG. 1 is a flow diagram of a method of monitoring a power switch for a fault condition.

FIG. 1 is a flow diagram of a method 100 of monitoring a power switch for a fault condition. At 105, a transistor of the power switch is activated or turned ON. At 110, the voltage across the power switch transistor is monitored using a varying threshold voltage that decreases with time after the activating of the transistor. Starting with a high threshold may avoid false detection of faults for good signals in the presence of ringing at the switch yet still detect real faults that exceed the threshold. At 115, a circuit fault is declared when the voltage of the transistor exceeds the varying threshold voltage. This detection using a decreasing threshold voltage can lead to a faster fault detection time.

Figure 2:
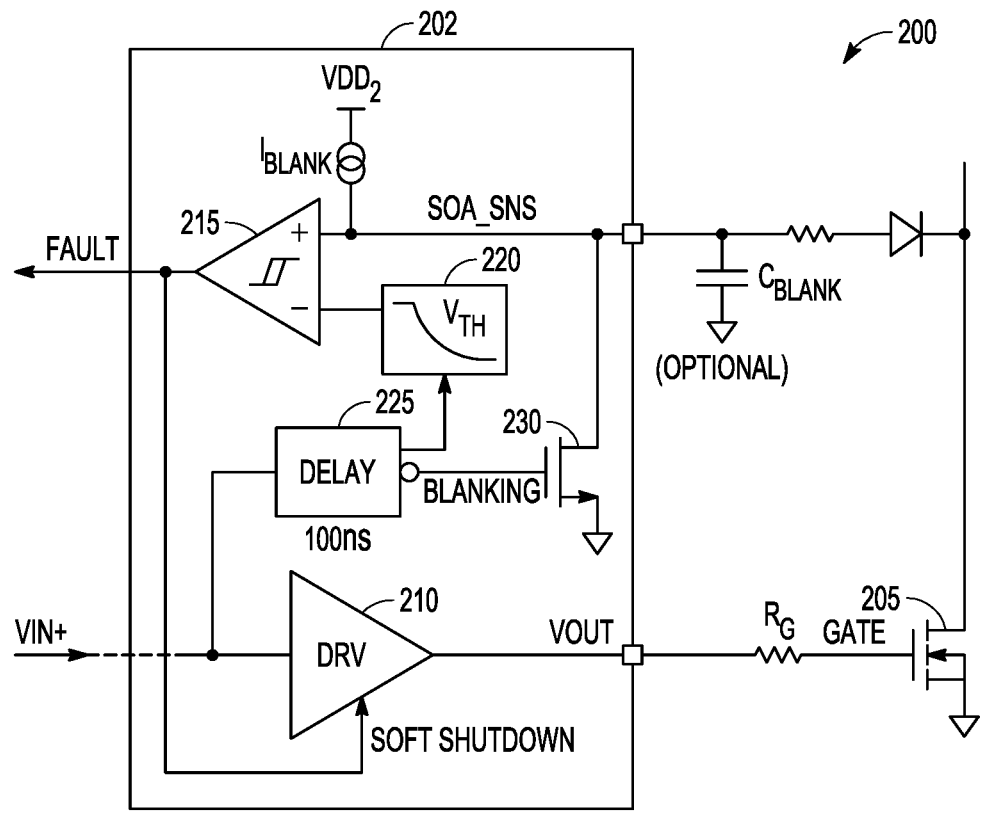
FIG. 2 is a circuit diagram of portions of a power converter circuit in an aspect.

FIG. 2 is a circuit diagram of portions of a power converter that may perform the example method of FIG. 1. The circuit 200 includes a power switch circuit that includes a power switch transistor 205. The power switch transistor 205 may be included in a half-bridge or full-bridge power converter. The circuit 200 also includes a driver circuit 210 that provides an activation signal to the power switch transistor and a fault detection circuit.

The fault detection circuit includes a comparator circuit 215. The comparator circuit 215 monitors the voltage across the transistor 205. In certain aspects, the voltage is monitored using the comparator and a biasing and blocking network. In certain aspects, the power switch transistor is a field effect transistor (FET) and the comparator monitors the drain to source voltage (VDs) of the FET. The power switch transistor 205 may be a silicon field effect transistor (Si FET), a silicon carbide FET (SiC FET), or a gallium nitride field effect transistor (GaN FET). In variations, the power switch transistor 205 is an insulated gate bipolar transistor (IGBT) or a bipolar junction transistor (BJT) and the comparator monitors the collector to emitter voltage (VCE) of the bipolar junction transistor. The comparator circuit 215 may be included on an integrated circuit 202 (IC) and power switch transistor 205 may be external to the IC.

Figure 3:
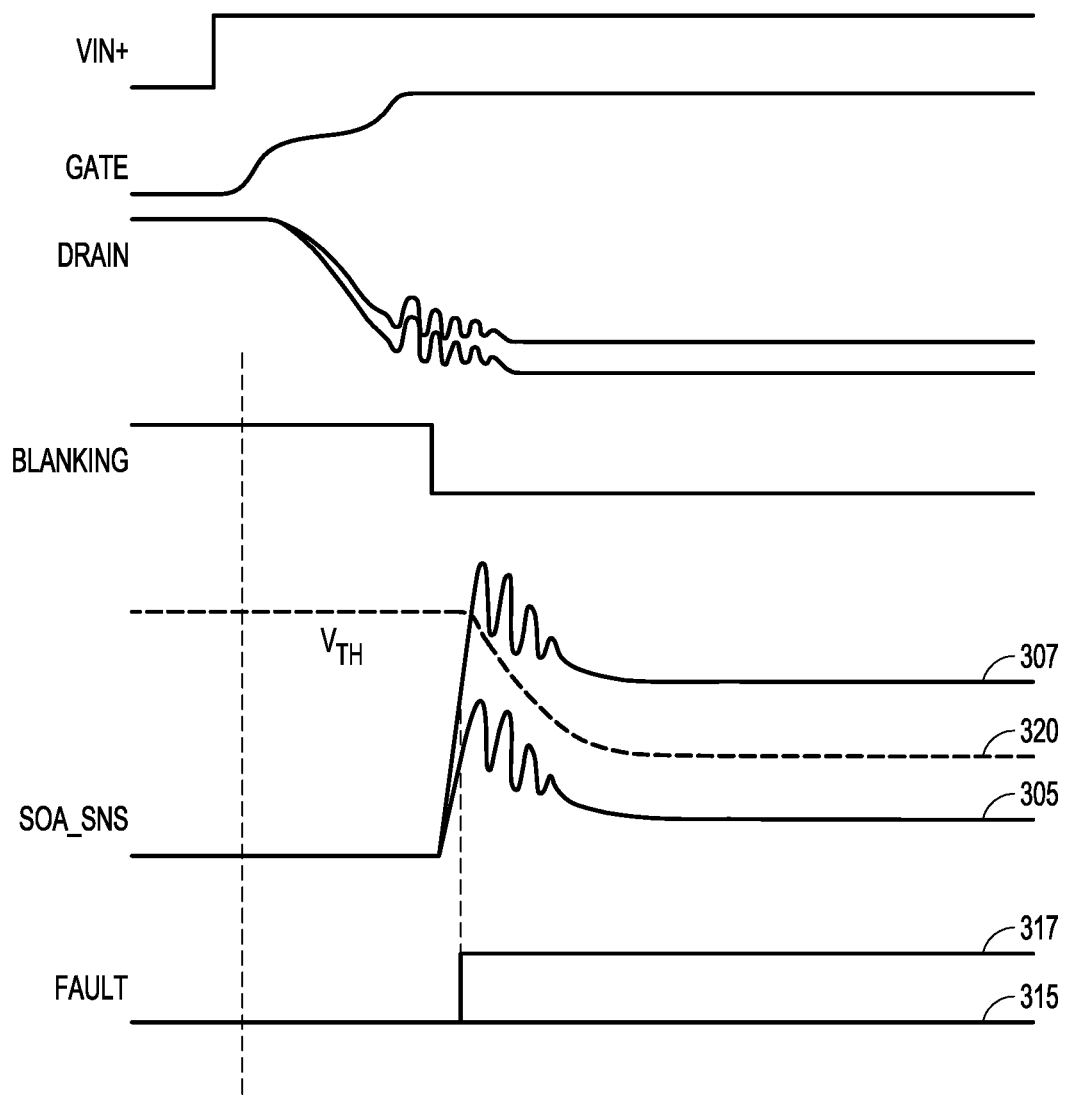
FIG. 3 illustrates waveforms associated with operation of the circuit in FIG. 2.

FIG. 3 illustrates waveforms associated with operation of the circuits in FIG. 2. Waveform VIN+ is the activation signal provided to the driver circuit 210 of FIG. 2 to turn ON the power switch transistor 205. The GATE waveform represents the voltage at the gate region of transistor 205. The DRAIN waveform represents the voltage at the drain region of power switch transistor 205. FIG. 3 shows that after VIN+ goes high, the gate voltage of the power switch transistor 205 starts to rise to turn on the transistor 205. As the power switch transistor 205 turns ON, the drain voltage drops and may exhibit ringing.

Returning to FIG. 2, the comparator circuit 215 monitors the voltage at the power switch transistor drain through node SOA_SNS to sense when the power switch transistor is operating in its safe operating area (SOA). The fault detection circuitry includes a threshold circuit 220 that generates the varying threshold voltage. The comparator circuit 215 compares the monitored voltage to the varying threshold voltage to detect a circuit fault. The comparator circuit output FAULT becomes active to indicate a circuit fault when the voltage of the power switch transistor is greater than the time varying threshold voltage. The detection of a fault may then be used to turn the driver circuit 210 off and deactivate the power switch. The comparator circuit 215 can use hysteresis in detecting the circuit fault, and the monitored voltage may have to fall to a level lower than the detection threshold voltage to turn OFF the FAULT indication.

The fault detection circuitry can include a delay circuit 225 to control timing of the comparison by the comparator circuit 215. The delay circuit 225 may disable monitoring of the voltage across the power switch transistor for a specified time duration following activation of the power switch transistor. In the example of FIG. 2, the output of the delay circuit 225 controls activation of a pull-down transistor 230 (e.g., an n-type FET). Activation of the pull-down transistor holds the SOA_SNS node low which holds the output of the comparator circuit 215 low. This disables the monitoring of the voltage across the power switch transistor. Returning to FIG. 3, the blanking waveform represents the signal on the "blanking" node at the output of the delay circuit 225 of FIG. 2. As shown in FIG. 3, node SOA_SNS is held low when the blanking node is high. The delay circuit 225 may hold the detection threshold voltage 320 $V_{TE}$ high at a non-time varying voltage level while node SOA_SNS is pulled low. After the specified time duration, the delay circuit deactivates the blanking signal allowing the comparator circuit 215 to compare the voltage across the power switch transistor to the time varying threshold voltage.

As shown in FIG. 3, waveform SOA_SNS exhibits ringing after the blanking interval, corresponding to ringing of the voltage at the drain region of power switch transistor 205. The detection threshold voltage $V_{TH}$ starts from a high level (e.g., 20 Volts) and begins to decrease after the time duration of the delay circuit 225. $V_{TH}$ may decrease exponentially with time (e.g., to 4 Volts as shown in FIG. 3).

Figure 4A:
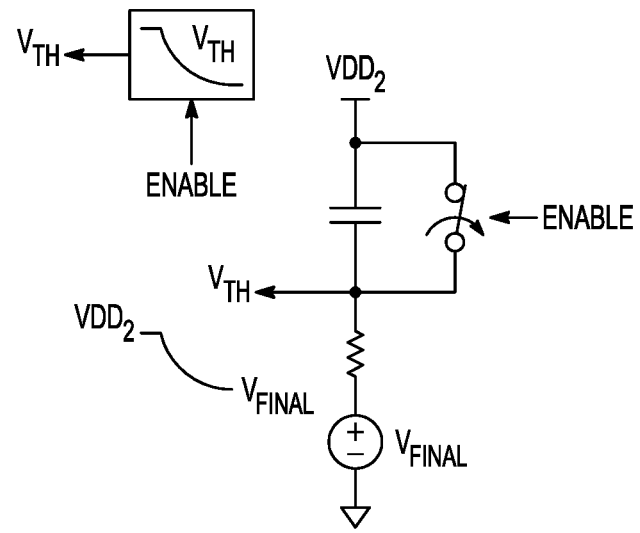
FIGS. 4A and 4B are circuit diagrams of examples of a circuit that generates a detection voltage that decreases exponentially according to some aspects.
Figure 4B:
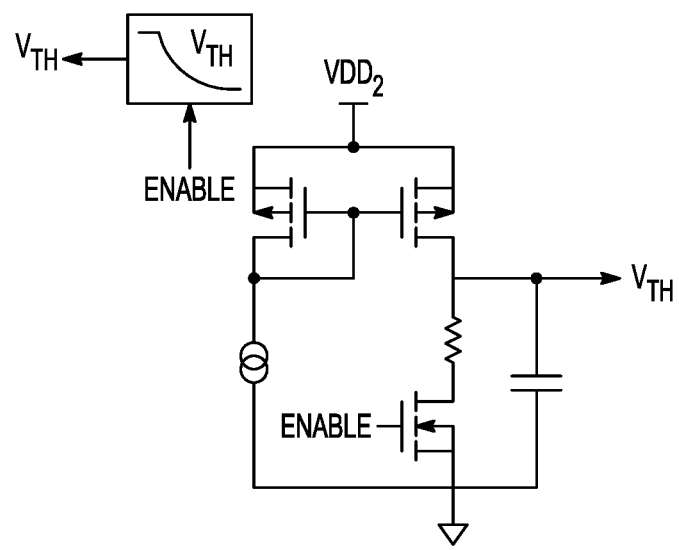
Figure 5:
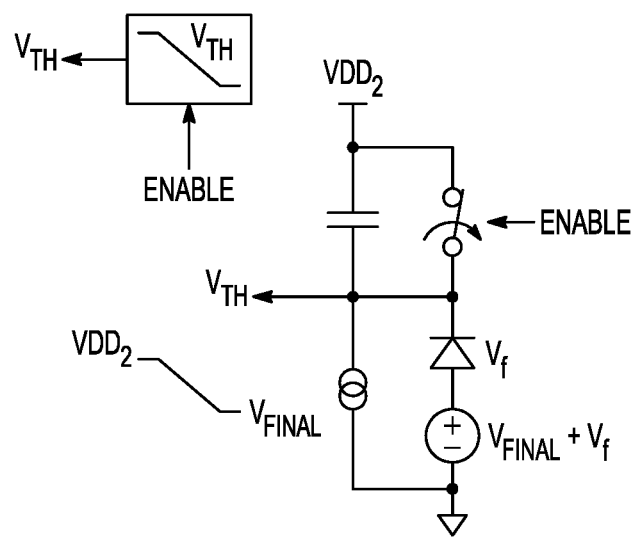
FIG. 5 is a circuit diagram of an example of a circuit that generates a detection voltage that decreases according to a ramp function in an aspect.

FIGS. 4A and 4B are circuit diagrams of examples of the threshold circuit 220 of FIG. 2 that generates a $V_{TH}$ that decreases exponentially with an RC time constant. The circuits include an enable input that can be provided by the delay circuit 225. $V_{TH}$ starts at voltage $V_{DD2}$ and decays to voltage $V_{final}$ according to a time constant determined by resistance R and capacitance C. In certain aspects, threshold circuit 220 decreases linearly according to a decreasing ramp function. FIG. 5 is a circuit diagram of an example of a threshold circuit 220 that generates a $V_{TH}$ that decreases according to a ramp function.

After the specified time duration, the comparing by the comparator circuit 215 is enabled. If the voltage on node SOA_SNS stays less than the decreasing $V_{TH}$, as shown in waveform 305, the FAULT output of the comparator remains low or inactive and no circuit fault is indicated as in waveform 315. If the voltage on node SOA_SNS goes higher than the decreasing $V_{TH}$, as shown in waveform 307, the FAULT output of the comparator goes high or active and a circuit fault is indicated as in waveform 317. The circuit fault may then be used to turn the driver circuit off and deactivate the switch.

Because of this initially high detection threshold $V_{TH}$, the comparator circuit 215 can be enabled (or unblanked) sooner than other approaches, and the ringing or residual settling of the monitored voltage will not falsely trigger a fault. Yet, high current faults that result in voltages over this initial detection threshold are detected right away.

The several examples of systems, devices, and method described can be used to provide improved fault detection for power converter circuits. The benefit of using a dynamic detection threshold is that the higher current faults, which require quickest detection, are caught early. It can be seen that the time-varying detection threshold improves on the use of merely delaying and filtering to avoid false early triggering, which may be too slow for some devices such as SiC FETs for example.

ADDITIONAL DESCRIPTION AND ASPECTS

Aspect 1 includes subject matter (such as an electronic circuit) comprising a power switch circuit and a fault detection circuit. The power switch circuit includes a power switch transistor. The fault detection circuit includes a comparator circuit configured to monitor a voltage across the power switch transistor and compare the voltage to a varying threshold voltage that decreases with time; wherein the fault detection circuit is configured to produce an indication of a circuit fault when the voltage of the power switch transistor is greater than the time varying threshold voltage.

In Aspect 2, the subject matter of Aspect 1 optionally includes a threshold circuit configured to generate a varying threshold voltage that decreases with time according to a decreasing ramp function.

In Aspect 3, the subject matter of Aspect 1 optionally includes a threshold circuit configured to generate a varying threshold voltage that decreases exponentially with time.

In Aspect 4, the subject matter of one or any combination of Aspects 1-3 optionally includes a delay circuit configured to disable monitoring of the voltage across the power switch transistor for a specified time duration following activation of the power switch transistor.

In Aspect 5, the subject matter of one or any combination of Aspects 1-4 optionally includes a delay circuit configured to disable the indication of the circuit fault of the fault detection circuit for a specified time duration following activation of the power switch transistor.

In Aspect 6, the subject matter of Aspect 1 optionally includes a threshold circuit configured to generate the varying threshold voltage, and a delay circuit coupled to the threshold circuit and configured to set an output of the threshold circuit to a non-time varying voltage value that disables monitoring of the voltage across the power switch transistor for a specified time duration following activation of the power switch transistor.

In Aspect 7, the subject matter of one or any combination of Aspects 1-6 optionally includes a power switch transistor that is a field effect transistor (FET), and the comparator circuit is configured to monitor a drain to source voltage of the FET.

In Aspect 8, the subject matter of one or any combination of Aspects 1-6 optionally includes a power switch transistor that is a bipolar transistor, and the comparator circuit is configured to monitor a collector to emitter voltage of the bipolar transistor.

Aspect 9 can include subject matter (such as a method of monitoring a power switch for a fault condition) or can optionally be combined with one or any combination of Aspects 1-8 to include such subject matter, comprising activating a power switch transistor of the power switch, comparing a voltage across the transistor to a varying threshold voltage that decreases with time after the activating of the power switch transistor, and indicating a circuit fault when the voltage of the power switch transistor exceeds the varying threshold voltage.

In Aspect 10, the subject matter of Aspect 9 optionally includes comparing the voltage to a threshold voltage that decreases with time according to a ramp function.

In Aspect 11, the subject matter of Aspect 9 optionally includes comparing the voltage to a threshold voltage that decreases exponentially with time.

In Aspect 12, the subject matter of one or any combination of Aspects 9-11 optionally includes delaying the comparison after a specified time duration after the power switch transistor is turned on.

In Aspect 13, the subject matter of one or any combination of Aspects 9-12 optionally includes comparing a drain to source voltage of a field effect transistor (FET) to the varying threshold voltage.

In Aspect 14, the subject matter of one or any combination of Aspects 9-13 optionally includes comparing a voltage across a power switch transistor that is one of a silicon carbide FET (SiC FET), a silicon FET (Si FET), or a gallium nitride FET (GaN FET) to the varying threshold voltage.

In Aspect 15, the subject matter of one or any combination of Aspects 9-12 optionally includes comparing a voltage across a power switch transistor that is an insulated gate bipolar transistor (IGBT) to the varying threshold voltage.

In Aspect 16, the subject matter of one or any combination of Aspects 9-12 optionally includes comparing a collector to emitter voltage of a bipolar transistor to the varying threshold voltage.

Aspect 17 can include subject matter (such as a switching power converter circuit) or can optionally be combined with one or any combination of Aspects 1-16 to include such subject matter, comprising a power switch circuit and fault detection circuit. The power switch circuit is configured to provide energy to an energy storage circuit element of the switching power converter circuit, wherein the power switch circuit includes a power transistor. The fault detection circuit includes a comparator circuit configured to monitor a voltage across the power transistor and compare the voltage to a varying threshold voltage that decreases with time, and the fault detection circuit is configured to produce an indication of a circuit fault when the voltage across the power transistor is greater than the varying threshold voltage.

In Aspect 18, the subject matter of Aspect 17 optionally includes a power transistor that is one of a silicon carbide field effect transistor (SiC FET), a silicon field effect transistor (Si FET), or a gallium nitride field effect transistor (GaN FET), and the comparator circuit is configured to monitor a drain to source voltage of the transistor.

In Aspect 19, the subject matter of Aspect 17 optionally includes a power transistor that is one of a bipolar junction transistor (BJT) or an insulated gate bipolar transistor (IGBT), and the fault detection circuit is configured to monitor a collector to emitter voltage of the transistor.

In Aspect 20, the subject matter of one or any combination of Aspects 17-19 optionally includes a fault detection circuit including a delay circuit configured to delay the decrease of the varying threshold voltage with time for a specified time duration following activation of the power transistor.

These non-limiting Aspects can be combined in any permutation or combination. The above detailed description includes references to the accompanying drawings, which form a part of the detailed description. The drawings show, by way of illustration, specific embodiments in which the invention can be practiced. These embodiments are also referred to herein as "examples" or "aspects." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. Method examples described herein can be machine or computer-implemented at least in part.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. An electronic circuit comprising:
    a power switch circuit including a power switch transistor; and
    a fault detection circuit including a comparator circuit configured to monitor a voltage across the power switch transistor;
    a threshold circuit configured to generate a varying threshold voltage that decreases with time in response to activation of the power switch transistor; and
    compare the monitored voltage to the varying threshold voltage; wherein the fault detection circuit is configured to produce an indication of a circuit fault when the voltage of the power switch transistor is greater than the time varying threshold voltage.

2. The electronic circuit of claim 1, wherein the threshold circuit is configured to decrease the varying threshold voltage with time according to a decreasing ramp function.

3. The electronic circuit of claim 1, wherein the threshold circuit is configured to decrease the varying threshold voltage exponentially with time.

4. The electronic circuit of claim 1, including a delay circuit configured to disable monitoring of the voltage across the power switch transistor for a specified time duration following activation of the power switch transistor.

5. The electronic circuit of claim 1, including a delay circuit configured to disable the indication of the circuit fault of the fault detection circuit for a specified time duration following activation of the power switch transistor.

6. The electronic circuit of claim 1, including:
    a threshold circuit configured to generate the varying threshold voltage; and
    a delay circuit coupled to the threshold circuit and configured to set an output of the threshold circuit to a non-time varying voltage value that disables monitoring of the voltage across the power switch transistor for a specified time duration following activation of the power switch transistor.

7. The electronic circuit of claim 1, wherein the power switch transistor is a field effect transistor (FET), and the comparator circuit is configured to monitor a drain to source voltage of the FET.

8. The electronic circuit of claim 1, wherein the power switch transistor is a bipolar transistor, and the comparator circuit is configured to monitor a collector to emitter voltage of the bipolar transistor.

9. A method of monitoring a power switch for a fault condition, the method comprising:
    activating a power switch transistor of the power switch;
    generating a varying threshold voltage that decreases with time relative to a turn on time of the power switch transistor;
    comparing a voltage across the transistor to the varying threshold after the activating of the power switch transistor; and
    indicating a circuit fault when the voltage of the power switch transistor exceeds the varying threshold voltage.

10. The method of claim 9,
    wherein generating the varying threshold voltage includes generating a varying threshold voltage that decreases with time according to a ramp function; and
    wherein comparing a voltage across the power switch transistor includes comparing the voltage to the threshold voltage that decreases with time according to the ramp function.

11. The method of claim 9,
    wherein generating the varying threshold voltage includes generating a varying threshold voltage that decreases exponentially with time; and
    wherein comparing a voltage across the power switch transistor includes comparing the voltage to the threshold voltage that decreases exponentially with time.

12. The method of claim 9, wherein comparing a voltage across the power switch transistor includes delaying the comparison after a specified time duration after the power switch transistor is turned on.

13. The method of claim 9, wherein comparing a voltage across the power switch transistor includes comparing a drain to source voltage of a field effect transistor (FET) to the varying threshold voltage.

14. The method of claim 13, wherein the power switch transistor is one of a silicon carbide FET (SiC FET), a silicon FET (Si FET), or a gallium nitride FET (GaN FET).

15. The method of claim 13, wherein the power switch transistor is an insulated gate bipolar transistor (IGBT).

16. The method of claim 9, wherein comparing a voltage across the power switch transistor includes comparing a collector to emitter voltage of a bipolar transistor to the varying threshold voltage.

17. A switching power converter circuit comprising:
    a power switch circuit configured to provide energy to an energy storage circuit element of the switching power converter circuit, wherein the power switch circuit includes a power transistor;
    a threshold circuit configured to generate a varying threshold voltage that decreases with time relative to a turn on time of the power switch transistor; and
    a fault detection circuit including a comparator circuit configured to monitor a voltage across the power transistor and compare the voltage to the varying threshold voltage; wherein the fault detection circuit is configured to produce an indication of a circuit fault when the voltage across the power transistor is greater than the varying threshold voltage.

18. The switching power converter circuit of claim 17, wherein the power transistor is one of a silicon carbide field effect transistor (SiC FET), a silicon field effect transistor (Si FET), or a gallium nitride field effect transistor (GaN FET), and the comparator circuit is configured to monitor a drain to source voltage of the transistor.

19. The switching power converter circuit of claim 17, wherein the power transistor is one of a bipolar junction transistor (BJT) or an insulated gate bipolar transistor (IGBT), and the fault detection circuit is configured to monitor a collector to emitter voltage of the transistor.

20. The switching power converter circuit of claim 17, wherein the fault detection circuit includes a delay circuit configured to delay the decrease of the varying threshold voltage with time for a specified time duration following activation of the power transistor.

\* \* \* \* \*